(12) United States Patent
Chao et al.

(10) Patent No.: US 10,460,061 B2
(45) Date of Patent: Oct. 29, 2019

(54) SYSTEM AND METHOD FOR ANTI REVERSE ENGINEERING FOR ANALOG INTEGRATED CIRCUIT

(71) Applicant: IPGREAT INCORPORATED, Grand Cayman (KY)

(72) Inventors: Yuan-Ju Chao, Cupertino, CA (US); Ta-Shun Chu, Hsinchu (TW)

(*) Notice: Subject to any disclaimer, the term of this patent is extended or adjusted under 35 U.S.C. 154(b) by 186 days.

(21) Appl. No.: 15/723,239

(22) Filed: Oct. 3, 2017

(65) Prior Publication Data
US 2019/0102502 A1    Apr. 4, 2019

(51) Int. Cl.
*G06F 17/50* (2006.01)

(52) U.S. Cl.
CPC ................ *G06F 17/5072* (2013.01)

(58) Field of Classification Search
USPC .......... 716/100, 112, 113, 118, 119
See application file for complete search history.

(56) References Cited

U.S. PATENT DOCUMENTS 5,357,572 A * 10/1994 Bianco ............. G01R 31/31719
                                                        380/2
9,852,251 B2 * 12/2017 Lu ...................... G06F 17/5072
2006/0036984 A1 * 2/2006 Mukaihira ........... G06F 17/5081
                                                        716/115
2008/0124906 A1 * 5/2008 Moon .................. H01L 27/0207
                                                        438/584
2008/0176343 A1 * 7/2008 Chang ................. G06F 17/5068
                                                        438/5
2009/0111257 A1 * 4/2009 Hsu .................... H01L 21/76816
                                                        438/599
2015/0140478 A1 * 5/2015 Chen ........................ G03F 1/36
                                                        430/5

OTHER PUBLICATIONS

Chen et al. "A Survey on Chip to System Reverse Engineering", University of Connecticut, Article in ACM Journal on Emerging Technologies in Computing Systems, Apr. 2016 (Year: 2016).*

* cited by examiner

*Primary Examiner* — Brian Ngo
(74) *Attorney, Agent, or Firm* — Tran & Associates (57) ABSTRACT

Systems and methods of restraining reverse engineering process for analog integrated circuit use techniques of adding dummy devices, device fragmentation, increasing bus width, employing different layouts for the same circuit element and mixing different types of passive devices increase complexity and makes the layout floorplan more difficult to be extracted for the reverse engineering. The system adds dummy devices and ensures the extra devices and capacitance do not affect the target circuit performance.

20 Claims, 15 Drawing Sheets

SYSTEM AND METHOD FOR ANTI REVERSE ENGINEERING FOR ANALOG INTEGRATED CIRCUIT

BACKGROUND

In the semiconductor industry, integrated circuit (IC) reverse engineering (RE) has been an effective technique to obtain insightful information. Reverse engineering procedure includes de-capsulation, cross section analysis, de-layering, circuit extraction and final netlist conversion. The package of IC is etched off in a corrosive acid solution first. The cross section of the manufacturing process is analyzed using a special machine tool to determine the thickness of each process layer. Then each layer is accurately stripped off one by one using etching or polishing. The devices dimension and the interconnection can be obtained and the associated circuitry can be extracted accordingly. The devices include resistor, capacitor, transistors, diodes and other components. The interconnection wires are numbered and annotated; finally a netlist can be extracted and converted to reversed circuit diagram or schematic.

Integrated circuit (IC) reverse engineering (RE) is particularly more straightforward on analog circuitry due to the fact that the device dimensions in analog circuit are larger, the total number of devices is smaller and the interconnection is less complicated compared to the digital circuit. Through reverse engineering (RE) process, integrated circuit (IC) can be copied or cloned by the competitors. Counterfeit IC has been a major problem in the IC industry because of the reliability and security issues. The counterfeit IC on aerospace and military sectors is especially a major concern.

SUMMARY

Counterfeit IC has been a threat for aerospace and defense industry. The integrated circuit diagram can be extracted through reversing engineering process. To restrain reverse engineering process on analog integrated circuit, methods of (1) Complexity Expansion and (2) Circuit Disguise have been developed.

In one aspect, systems and methods of restraining reverse engineering process for analog integrated circuit use techniques of adding dummy devices, device fragmentation, increasing bus width, employing different layouts for the same circuit element and mixing different types of passive devices increase complexity and makes the layout floorplan more difficult to be extracted for the reverse engineering. The system adds dummy devices and ensures the extra devices and capacitance do not affect the target circuit performance.

In another aspect, methods of analog circuit design and physical layout floorplan have been developed to restrain the reverse engineering and increase the difficulty of reverse process. These developed two methods are (1) Complexity Expansion and (2) Circuit Disguise. The techniques of Complexity Expansion method include (A) adding dummy device and (B) device fragmentation. The techniques of Circuit Disguise method include (C) increasing bus width, (D) employing different layout floorplan for the same circuit element and (E) mixing different types of passive devices. An algorithm procedure of adding dummy device is also presented to ensure the added dummy circuitry does not affect the target design performance.

Implementations of the above aspect of Complexity Expansion and Circuit Disguise can include one or more of the following five techniques: (A) adding dummy devices, (B) device fragmentation, (C) increasing bus width, (D) employing different layout on the same circuit element and (E) mixing different types of passive devices.

A procedure of differentiating the static circuit and dynamic circuit and applying the dummy devices with respect to different circuitry is presented to ensure the added dummy devices and associated capacitances do not affect the specified target performance.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Furthermore, it is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Similarly, it is to be noticed that the term "coupled" discloses both direct and indirect coupling and should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

Two methods have been developed to restrain reverse engineering on integrated circuit. They are (1) Complexity Expansion and (2) Circuit Disguise respectively. Complexity Expansion is to increase the complication and complexity of the circuitry such that reversing and extracting the circuitry becomes very difficult and challenging. Circuit Disguise is to implement the physical layout in such a way that it misleads the reverse engineering process and finishes up with incorrect extracted circuitry.

The reason that digital circuit is much more difficult for reverse engineering is that digital circuit is more complicated in terms of the number of connection and the device dimension is smaller. By making the analog circuit and floorplan toward digital implementation will increase the difficulty for reverse process. The proposed techniques of Complexity Expansion are (A) adding dummy devices and (B) device fragmentation. Adding dummy devices attaches extra devices to the main functional devices in such a way that the number of devices and the number of connection nets are increased. Device fragmentation is to break down devices to many smaller devices, which increase the difficulty of extracting the circuitry.

The invented techniques of Circuit Disguise are (C) increasing bus width, (D) employing different layouts for the same circuit element and (E) mixing different types of passive devices. Often there are multiple bits for data signals or calibration signals in analog circuit like data converters. Increasing bus width creates more complication and makes the circuitry more unfavorable to be extracted. Employing different layouts for the same circuit element is to use multiple layout implementations for one same circuit, which misleads the reverse process that they are different circuit elements. Mixing different types of passive devices is to misguide the reverse process by placing different types or resistors or capacitors together. The mentioned five techniques of (A) adding dummy devices, (B) device fragmentation, (C) increasing bus width, (D) employing different layout for the same circuit element and (E) mixing different types of passive devices are summarized in the following table and will be explained and elaborated respectively.

| Methods | Techniques |
| --- | --- |
| 1. Complexity Expansion | (A) Adding dummy devices |
|  | (B) Device fragmentation |
| 2. Circuit Disguise | (C) Increasing bus width |
|  | (D) Employing different layouts for the same circuit element |
|  | (E) Mixing different types of passive devices |

Figure 1:
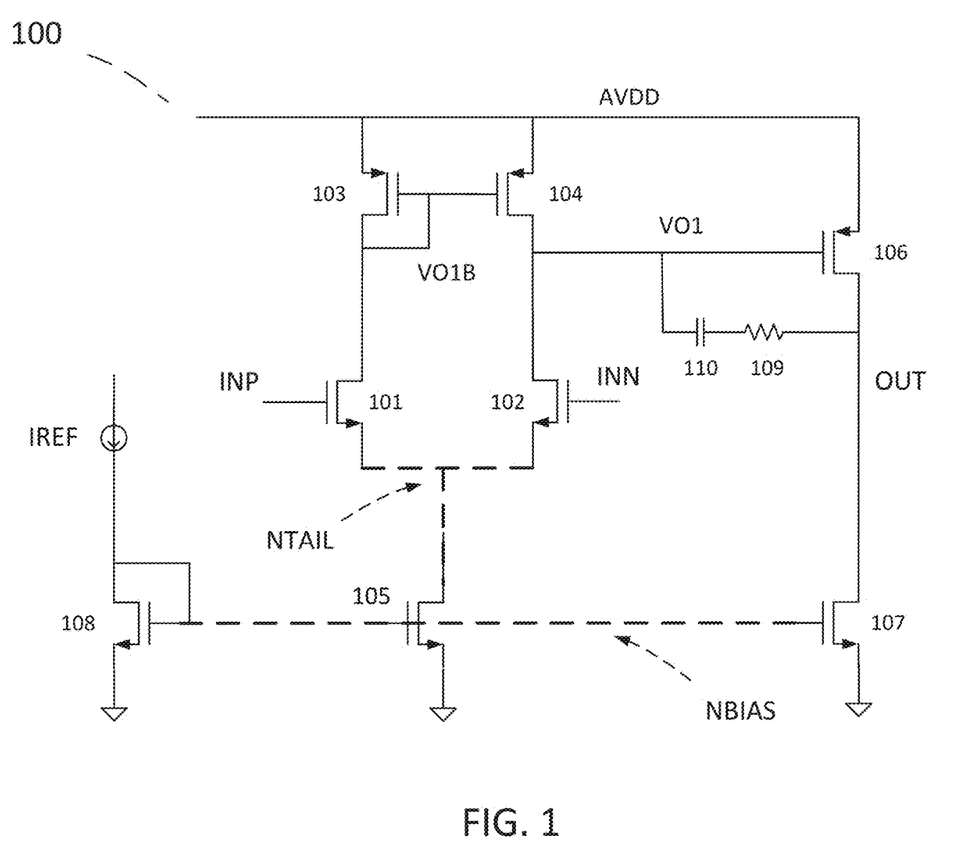
FIG. 1 shows a two-stage amplifier circuit diagram
Figure 2:
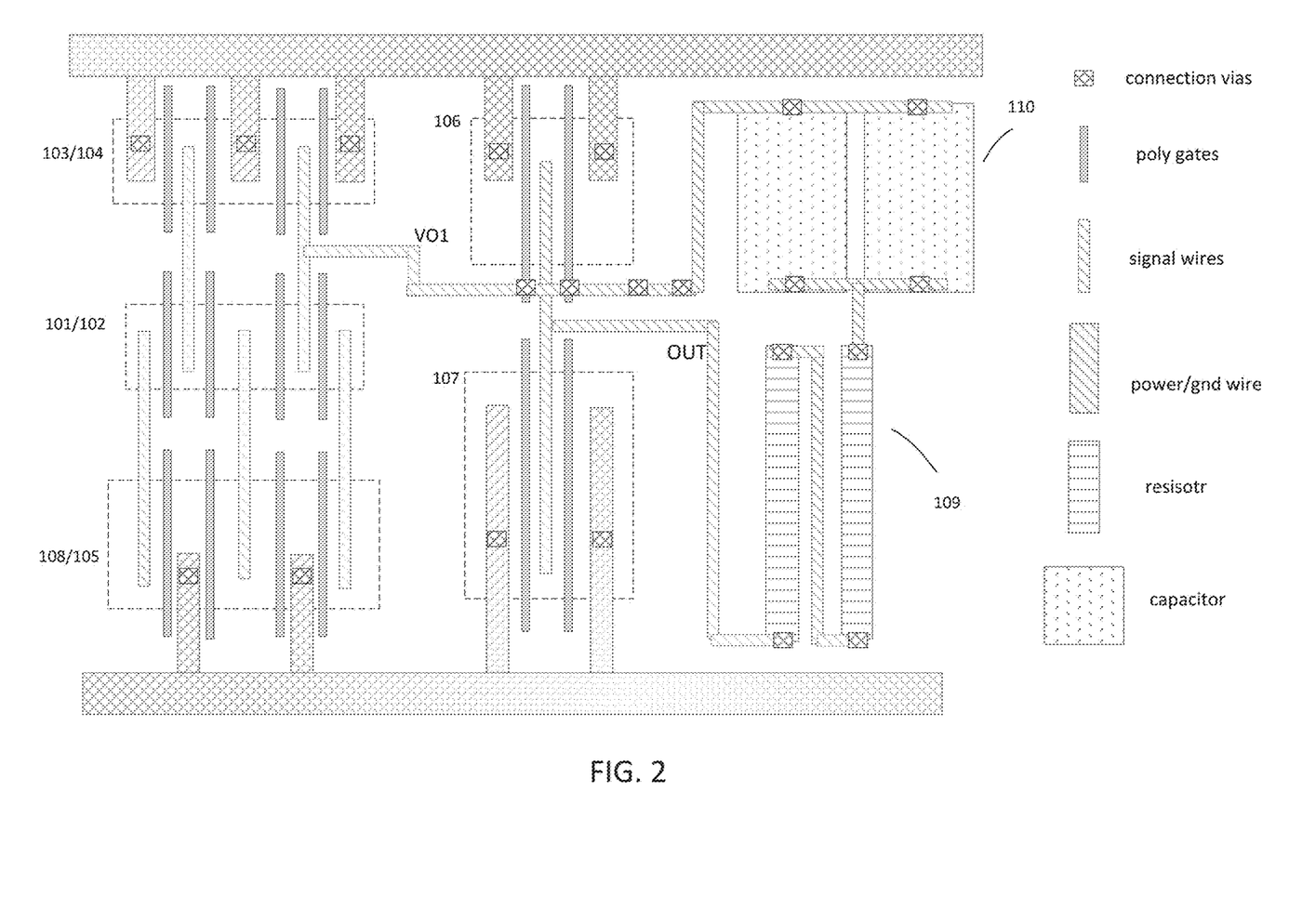
FIG. 2 illustrates the example layout floorplan of two-stage amplifier

FIG. 1 shows a common two-stage operational amplifier circuit schematic. This amplifier 100 consists of transistors 101 to 108, a resistor 109 and a capacitor 110. Device 101-105 form the first stage amplifier and device 106 and 107 form the second stage amplifier. Resistor 109 and capacitor 110 are used for compensation. FIG. 2 shows the corresponding layout floor plan of the amplifier. Note that the poly gate connection is not shown and two-finger configuration is assumed for all devices for simplicity reason.

Figure 3:
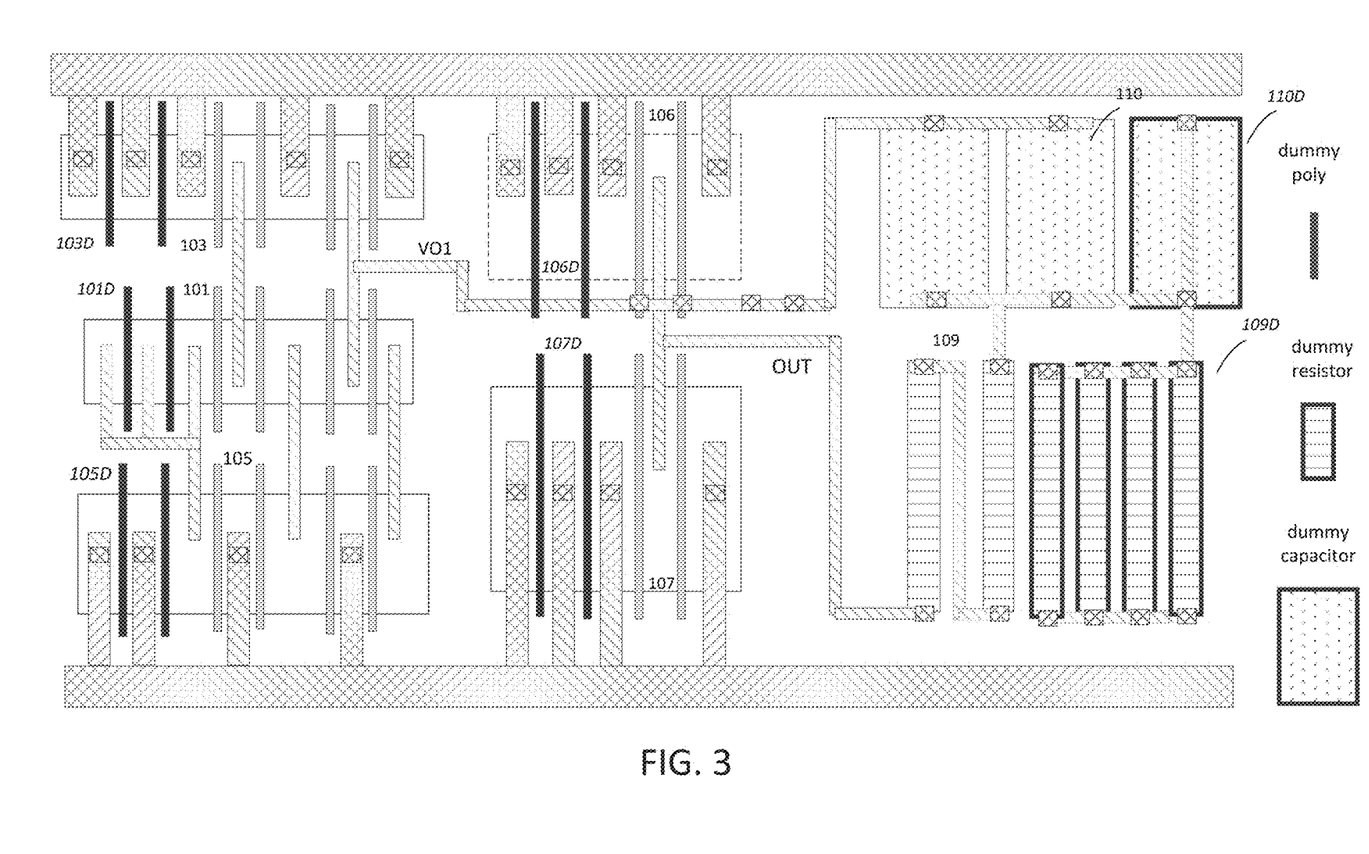
FIG. 3 is two-stage amplifier layout after applying adding dummy devices technique

Adding dummy devices makes the layout not as straightforward and restrains reverse engineering. FIG. 3 shows an example embodiment of the layout floorplan after applying method (A) adding dummy devices on the two-stage amplifier of FIG. 1. The added dummy devices are transistors 101D, 103D, 105D, 106D, 107D, capacitor 110D and resistor 109D which are outlined in darker color. The layout of FIG. 3 is much more difficult to reverse due to extra devices and more complicated net connection. Adding dummy devices increase the complexity of the circuit and make the reverse engineering more challenging.

Figure 4:
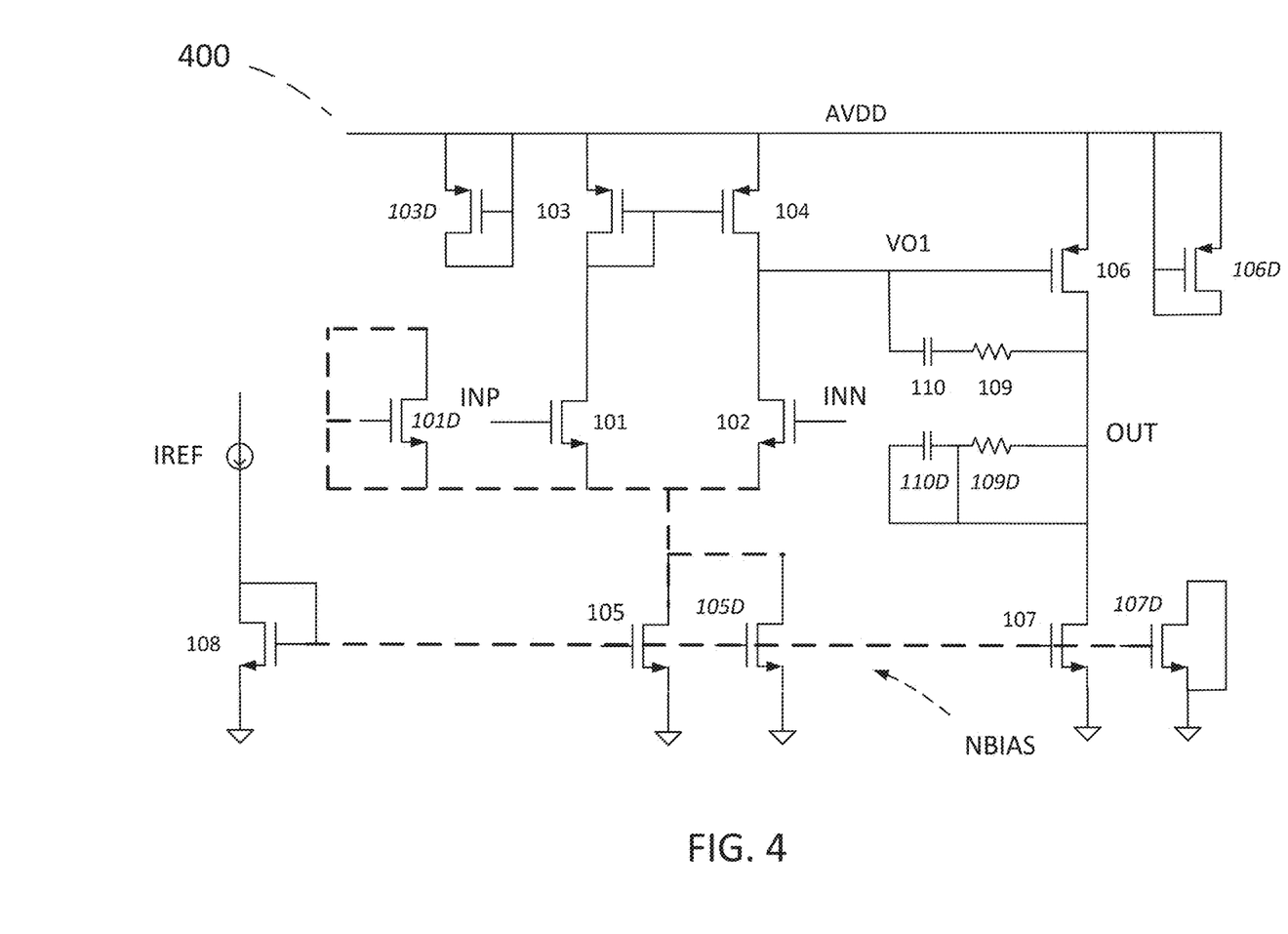
FIG. 4 is the corresponding circuit diagram of FIG. 3 layout

FIG. 4 is the corresponding circuit schematic of FIG. 3 layout implementation. The connection of the dummy devices varies and it creates different circuit characteristic. For the dummy devices that connected to power or ground like device 103D/106D, the added dummy devices are not functional. For the dummy devices that shorted to itself like device 109D/110D, the added dummy devices are not functional either. However, for the dummy devices that connected to signals like device 107D, it acts like a capacitor. The capacitance on node NBIAS is larger after adding dummy device 107D.

Figure 5:
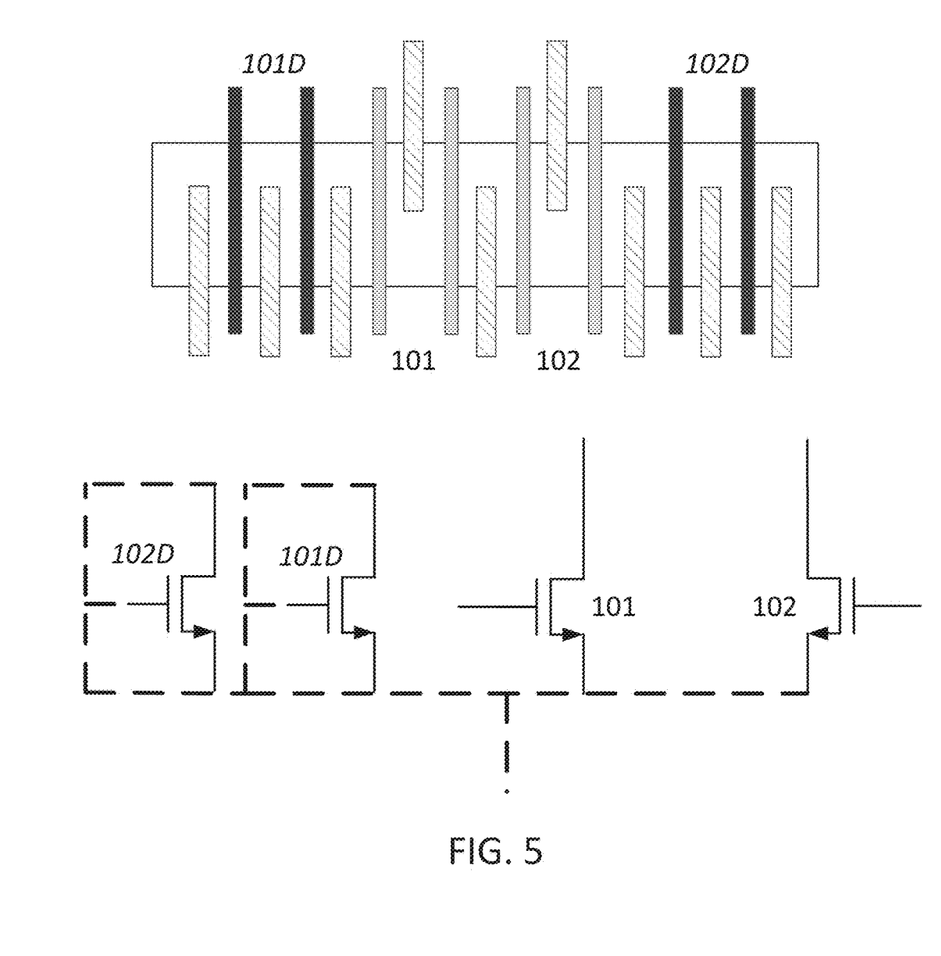
FIG. 5 is the example layout and circuit diagram of input pair with dummy on two sides
Figure 6:
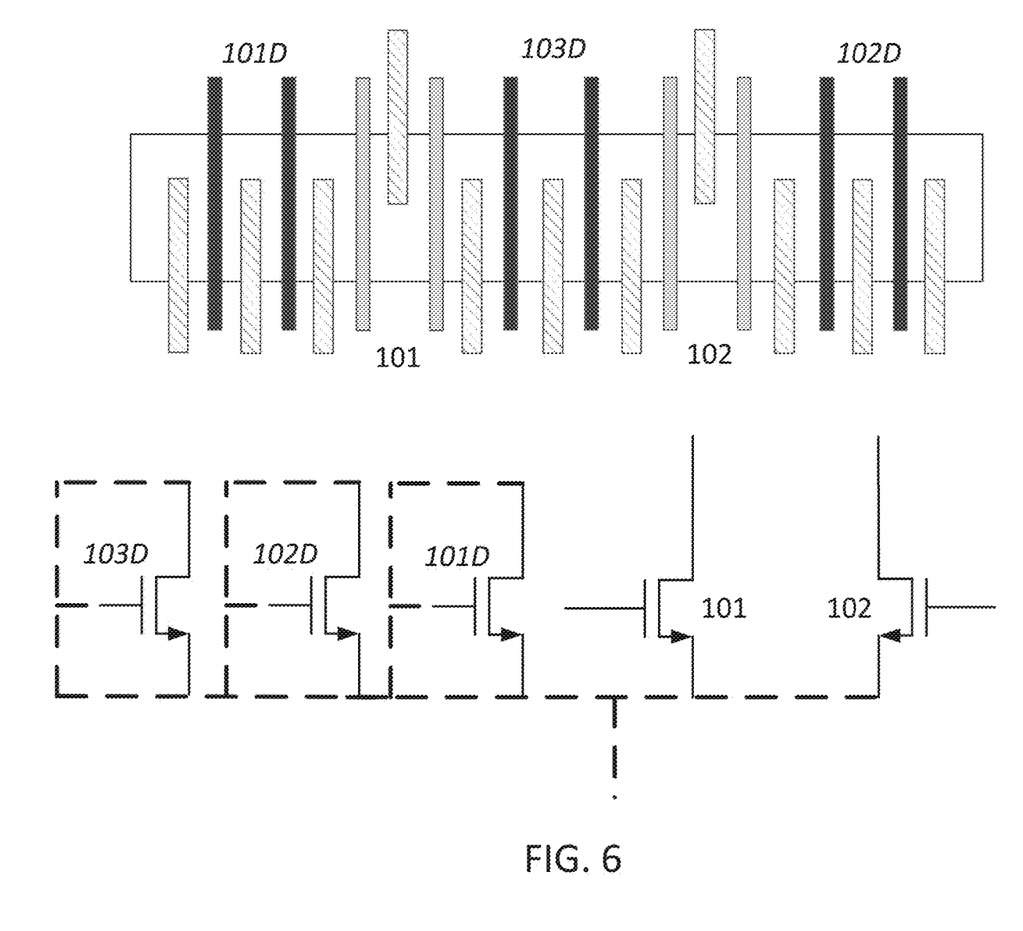
FIG. 6 is the layout and circuit diagram of the input pair with dummy on sides and also in the center

Adding dummy is a recommended practice for analog circuit layout to minimize the etch effect during fabrication and achieve better matching. For advanced technology process, the design rule even requires adding enough dummy devices on two sides to minimize the LOD (length of diffusion) and STI (shallow trench isolation) effect. To make the layout more difficult to be reversed, the dummy devices are inserted in the middle or center in additional to the dummy on two sides. FIG. 5 shows the common layout and circuit diagram of FIG. 1's input pair devices 101 and 102. The dummy devices 101D and 102D are inserted on two sides. FIG. 6 shows the layout after inserting extra dummy device 103D in the center. This layout is not straightforward to understand after inserting dummy devices in the middle in additional to dummy on two sides. Without detailed and attentive examination, the dummy devices could be extracted as input pair device and it finishes up with a wrong device dimension representation. Inserting the dummy devices in the center in additional to dummy on two sides misleads the reverse process for calculating which devices are functional devices and which devices are non-functional dummy devices.

Figure 7:
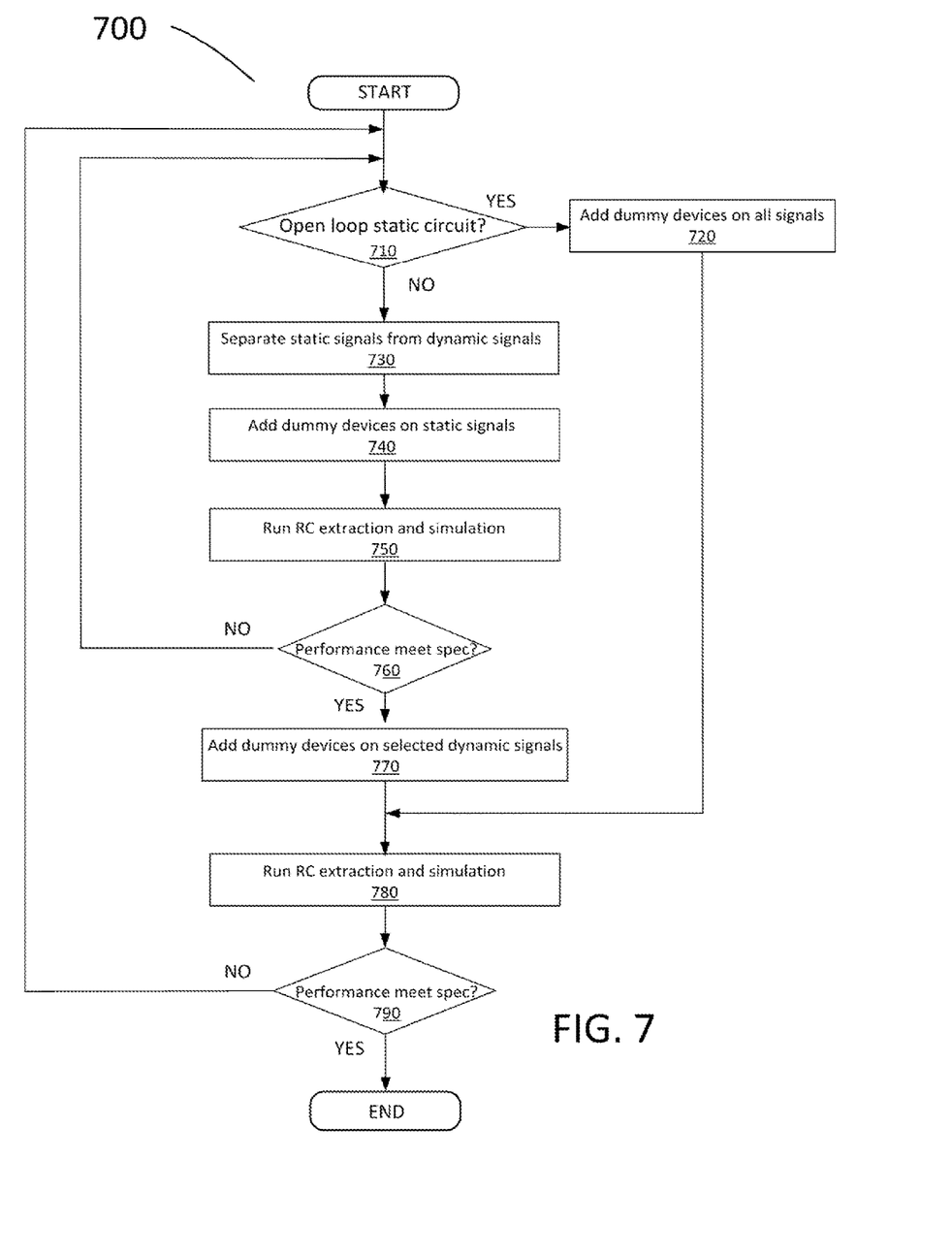
FIG. 7 is the algorithm procedure of adding dummy devices technique

Nevertheless, adding dummy devices could create extra capacitance that changes the circuit behavior. An algorithm procedure on FIG. 7 is developed to reinforce that the circuit performance is not affected by adding dummy devices. First step 710 of the algorithm is to check if this functional block is an open-loop static circuitry such as bias circuit. If it is an open-loop static circuitry, then dummy devices can be added on all the signal nets since the extra capacitance is not harmful and could be beneficial. The characteristic of the static circuit is not affected by adding extra dummy devices. If the block is a dynamic circuit such as amplifier or comparator, the static signals are separated from the dynamic signals on step 730. For instance, the signals NBIAS and NTAIL illustrated in dashed line on FIG. 1 are considered static since they are not on the input/output path. While the signal VO1 and VO1B are dynamic signals since they are on the path between input INP/INN and output OUT. Dummy devices are added on the static signals first and RC extraction and simulation are carried out to make sure the performance meets the specification on step 750 and 760. If the performance is not affected by adding the dummy on static signals, the dummy devices can then be added on selected dynamic signals next. Adding dummy devices on the sensitive node like amplifier output should be avoided. But adding dummy device on the non-sensitive node like amplifier non-dominated pole is feasible. RC extraction and simulation is run again after adding dummy devices on the selected dynamic nodes to make sure the added capacitance does not affect the target performance. If the simulation fails to meet the specifications, it loops back to step 710 to repeat the procedure steps until the criteria are satisfied.

Figure 8:
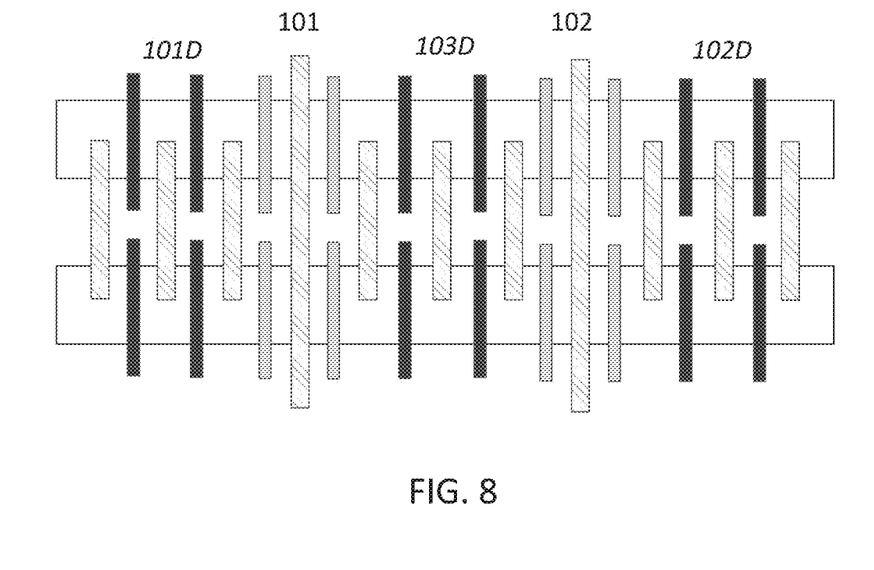
FIG. 8 shows the input pair layout after applying device fragmentation technique
Figure 9:
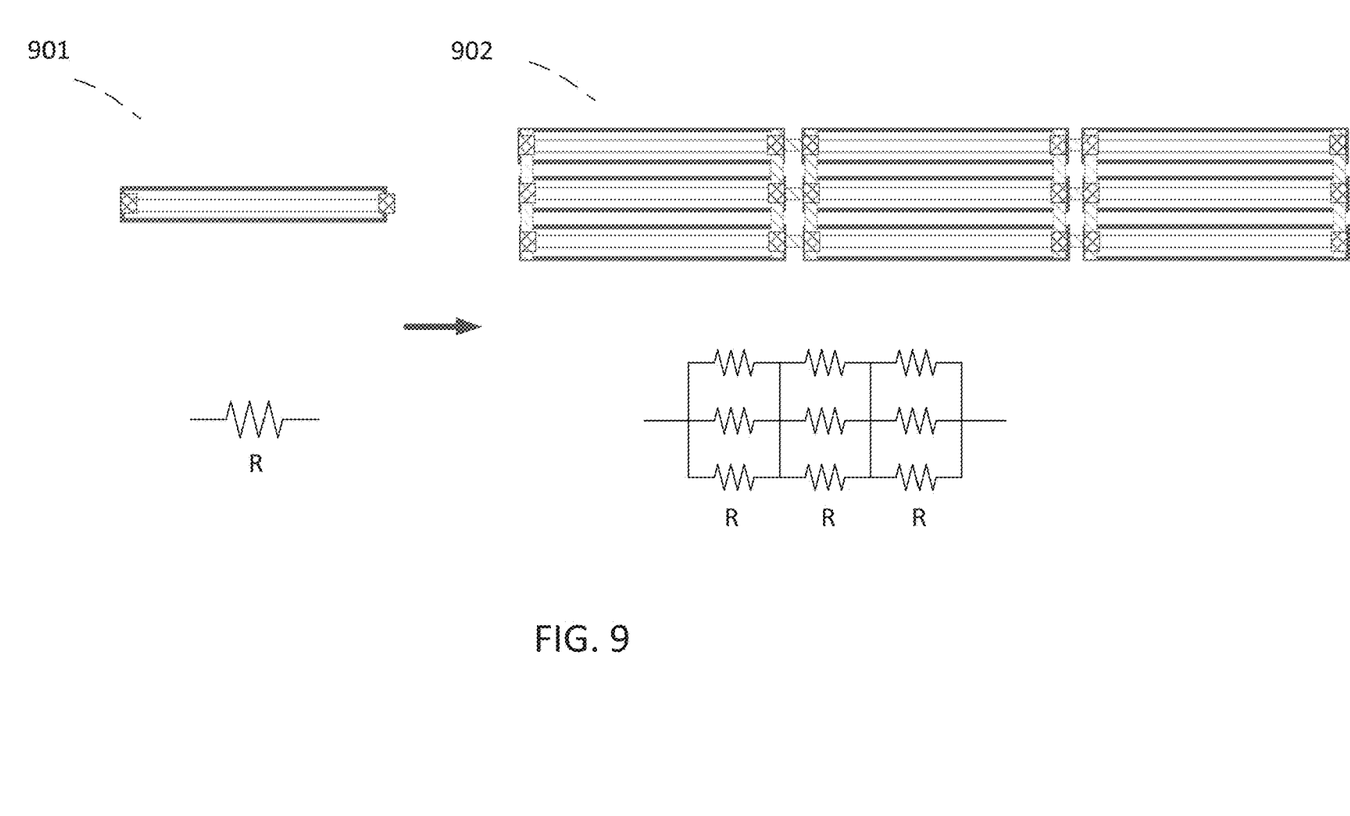
FIG. 9 is the resistor implementation before and after applying device fragmentation

Another Complexity Expansion technique is device fragmentation. By breaking down one device into multiple smaller devices, it creates more connection nets and makes the devices unfavorable to be recognized for reverse engineering. This technique applies to both active devices like transistors and passive devices like resistors and capacitors. FIG. 8 illustrates the layout floorplan of input pair 101 and 102 on FIG. 6 after applying device fragmentation technique. The devices are broken down into multiple smaller devices. With reduced dimension and increased connection nets and wiring, the effort of reverse engineering is much more demanding and challenging. FIG. 9 shows the layout and schematic of one resistor element 901 and resistor bank 902 after applying device fragmentation. Resistor element 901 and resistor bank 902 have the same resistance value but the connection complexity of resistor bank 902 is more difficult to be analyzed. By making the analog layout toward digital circuit format with many devices, it demands much more work and effort for the reverse engineering.

Figure 10:
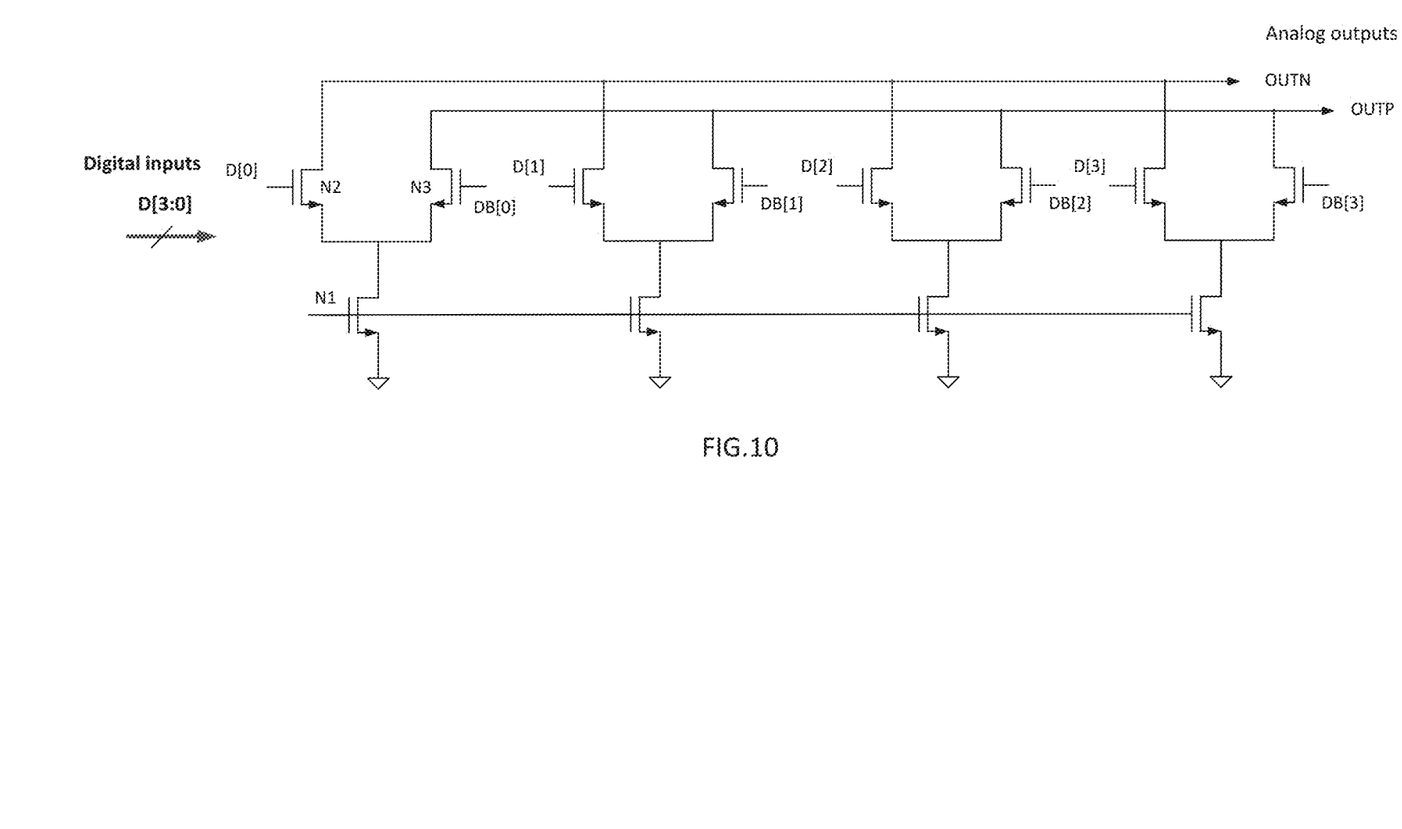
FIG. 10 is the circuit diagram of four-bit thermometer-code current source DAC
Figure 11:
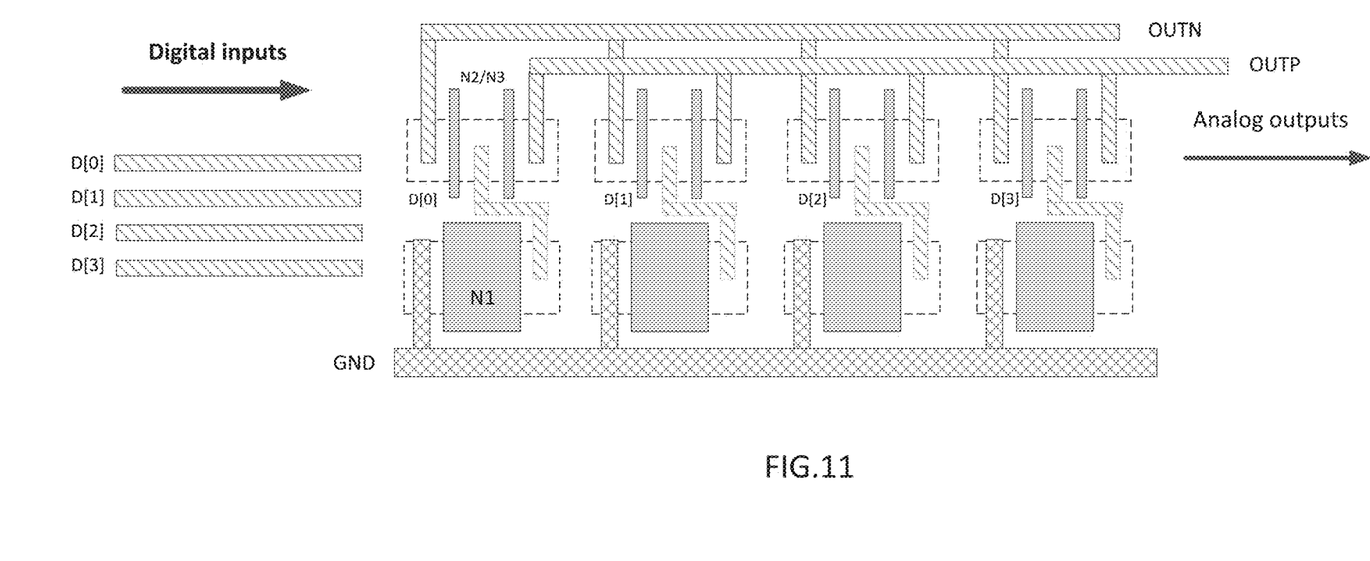
FIG. 11 is the example layout of four-bit thermometer-code current source DAC
Figure 12:
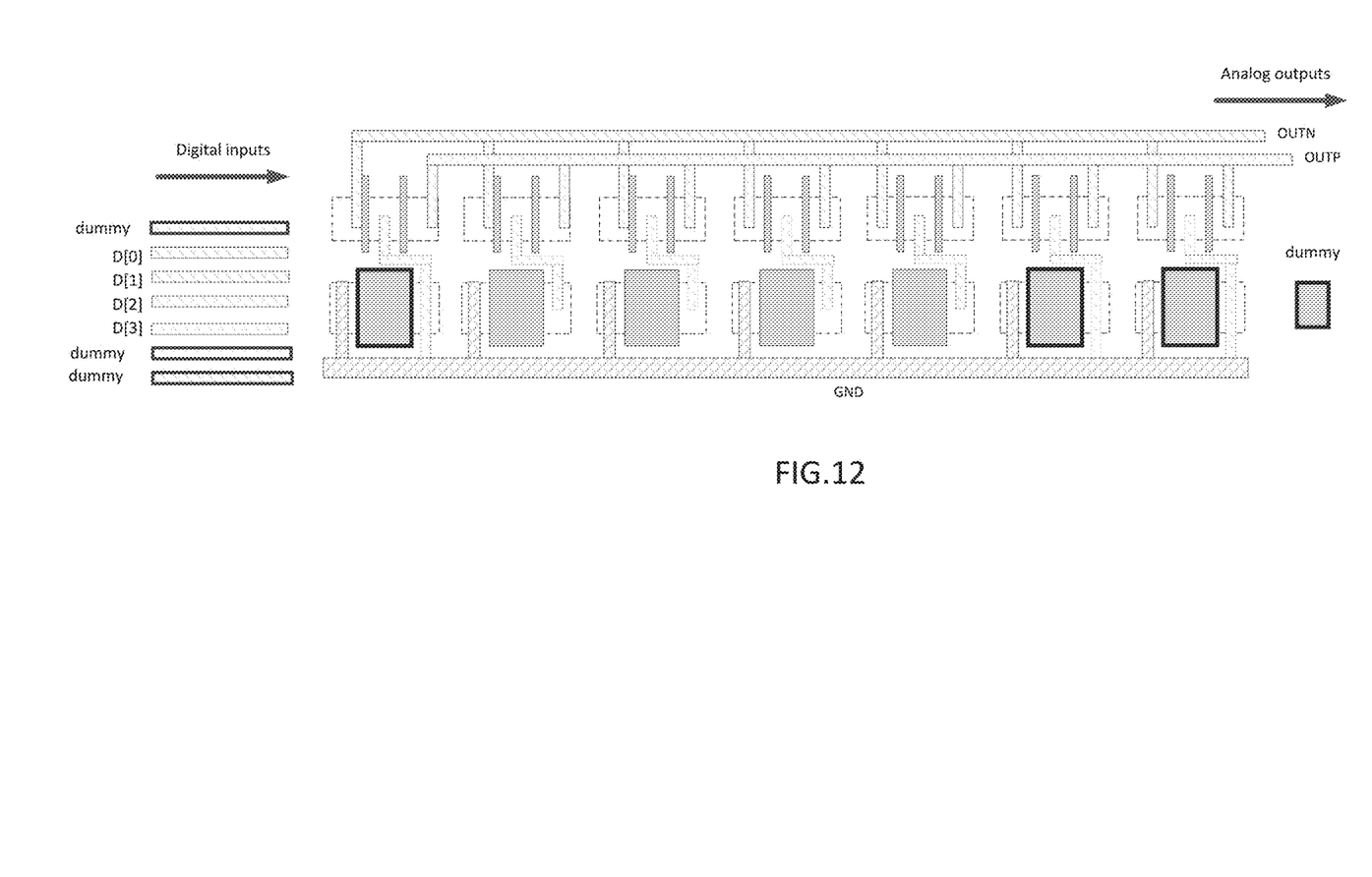
FIG. 12 is the layout of four-bit current source DAC after applying increasing bus width technique

FIG. 10 and FIG. 11 show the circuit diagram and corresponding layout floorplan of a four-bit thermometer-code current source digital-to-analog converter (DAC). The input/output signal flow goes from the digital inputs D[3:0] on the left to the analog outputs OUTP/OUTN on the right. The floorplan of FIG. 11 is straightforward and can be analyzed and extracted to be a similar circuit schematic like FIG. 10. By applying (C) adding bus width technique, three extra dummy buses have been added on the left and three extra current sources have been placed as dummy devices. FIG. 12 shows the example layout floorplan after increasing the bus width. With extra bus signals and dummy devices, the layout of FIG. 12 is not straightforward to be considered as a four-bit DAC. It could be extracted to be a seven-bit or five-bit DAC and ends up with an incorrect interpretation of the circuitry.

Figure 13:
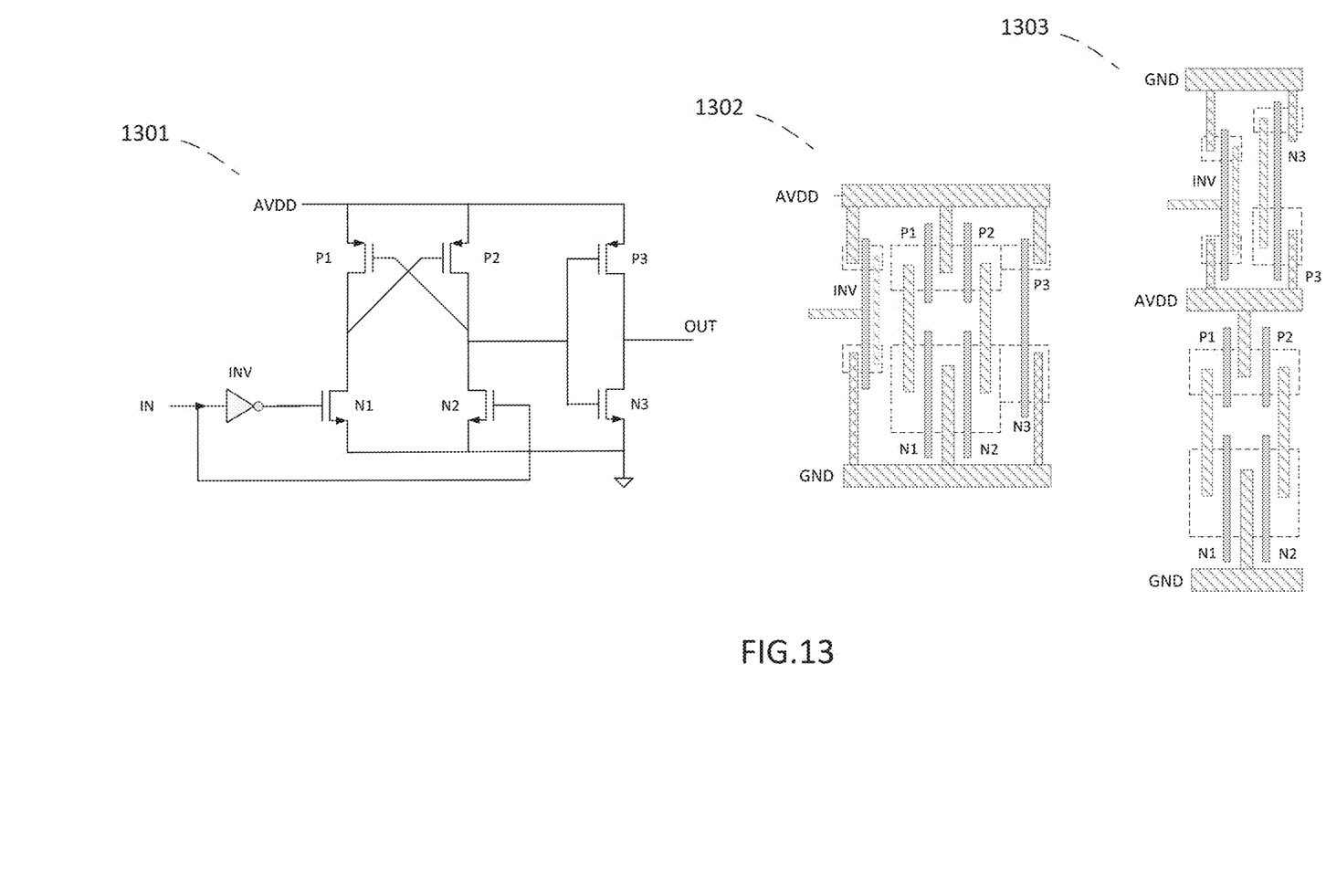
FIG. 13 shows the level shifter circuit diagram and two example layout realizations

Another technique of Circuit Disguise is (D) employing different layouts for the same circuit element. FIG. 13 shows the example embodiment diagram of a commonly used voltage level shifter and the corresponding layout implementation. The schematic of 1301 can be implemented as different layout forms. The representation of 1302 and 1303 on FIG. 13 illustrates two possible layout realizations. By using and placing different layout realizations of the same circuit element in various locations of the chip floorplan, the added complication and complexity of the layout floorplan make reverse engineering more difficult to be extracted. They could be considered as different circuit element although in fact they are the same functional schematic.

Figure 14:
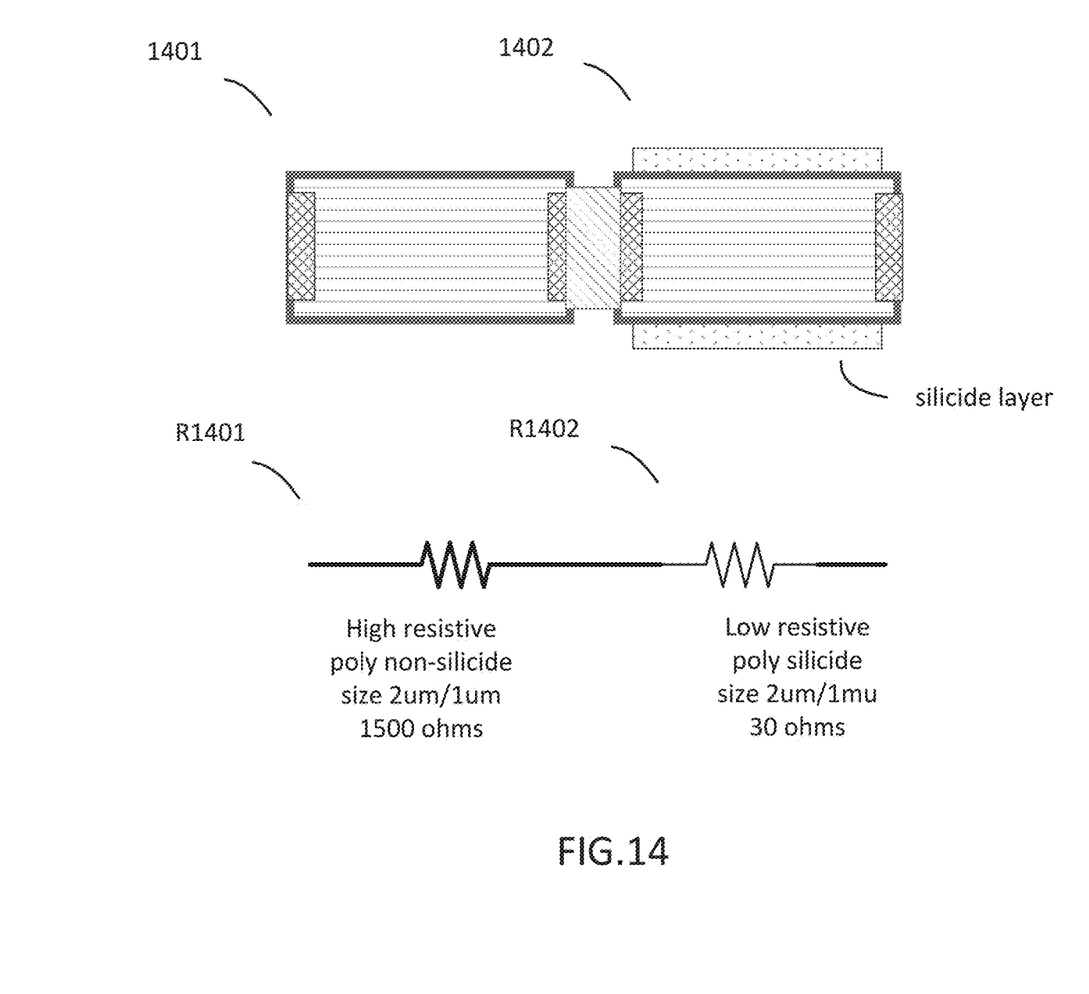
FIG. 14 shows the layout and circuit diagram of mixing different types of resistors

Another technique of Circuit Disguise is (E) mixing different types of passive devices. The foundry design kits offer different types of resistors and capacitors with varying characteristics. For example, the resistor type can be low-resistive poly silicide or high-resistive poly non-silicide. Silicide is a process to lower the sheet resistance. The silicide process is implemented in the front-end based layers instead of back-end metal layers during manufacturing. Therefore, the reverse engineering cannot differentiate which type of resistor since this based process layer is not extracted during reverse process. FIG. 14 shows the layout and schematic of two resistors with mixing of high resistive poly non-silicide and low resistive poly silicide. R1401 and R1402 are high resistive poly non-silicide and low resistive poly silicide respectively. With the same dimension of 2 um/1 um, the resistance value 1500 ohms of R1401 is much higher than R1402's resistance 30 ohms. The total resistance of the two resistors in series is 1530 ohms. However, since the layout floorplan of these two resistors cannot be differentiated as shown as element 1401 and 1402 on FIG. 14. The reverse engineering process would treat these two resistors the same and the extracted resistor values would be incorrect.

Figure 15:
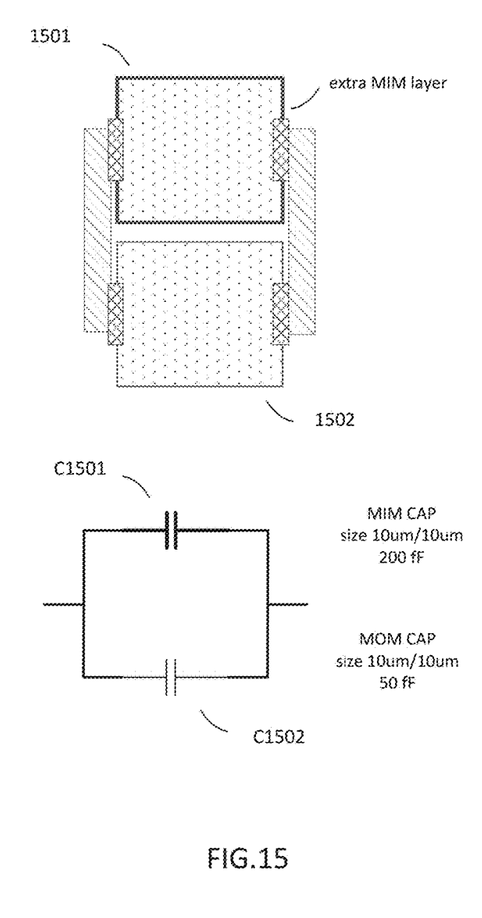
FIG. 15 shows the layout and circuit diagram of mixing different types of capacitors

Similarly, FIG. 15 shows the layout and schematic of two capacitors in parallel using MIM (metal insulator metal) cap and MOM (metal oxide metal) cap. With the same dimension of 10 um/10 um, C1501 MIM cap value 200 fF is higher than C1502 MOM cap value 50 fF. However, the reverse engineering extraction cannot differentiate these two capacitors and would interpret it with wrong capacitor value.

Two methods of Complexity Expansion and Circuit Disguise have been developed to restrain reverse engineering on analog integrated circuit. Five techniques: (A) adding dummy devices, (B) device fragmentation, (C) increasing bus width, D) employing different layouts for the same circuit element and (E) mixing different types of passive devices have been presented to make the layout floorplan more complicated and more difficult to analyze. These methods and techniques intentionally mislead the reverse engineering process and the extracted netlist can be false presentation of the actual circuitry.

What is claimed is:

1. A method for designing an integrated circuit (IC), comprising:
    adding anti-reverse engineering for the IC by expanding complexity of one or more circuits or disguising a selected circuit;
    checking if a functional block is an open-loop static circuitry and adding dummy devices on signal nets for open loop static circuits and otherwise separating static signals from dynamic signals and adding dummy devices on static signals; and
    rendering a layout of the IC with the anti-reverse engineering design.

2. The method of claim 1, wherein the expanding complexity comprises adding one or more dummy devices.

3. The method of claim 2, comprising inserting the dummy devices in a middle in addition to placing the dummy devices on one or more sides of one or more functional devices of the IC.

4. The method of claim 1, wherein the expanding the complexity comprises device fragmentation.

5. The method of claim 4, comprising implementing an analog circuit floorplan to resemble a digital circuitry layout format by using multiple small device layouts.

6. The method of claim 4, wherein active devices are broken down into multiple smaller devices to add complexity against reverse engineering.

7. The method of claim 4, wherein passive devices including resistors or capacitors are implemented by a bank of multiple resistors or capacitors in parallel or in serial format to add complexity against reverse engineering.

8. The method of claim 1, comprising disguising a circuit by increasing a bus width.

9. The method of claim 8, wherein the bus signal width of circuitry is increased with inserted dummy signals to add complexity and restrain reverse engineering.

10. The method of claim 1, wherein the circuit disguise employs different layouts for the same circuit element.

11. The method of claim 10, wherein different layout realizations are used for the same circuit to misguide the reverse engineering.

12. The method of claim 1, wherein the circuit disguise mixes different types of passive devices.

13. The method of claim 12, wherein forming a resistor or a capacitor by using different type of resistors or capacitors to mislead the reverse engineering process intentionally.

14. The method of claim 1, comprising adding dummy devices to reinforce a target circuit, and meeting a predetermined performance with added devices and associated extra capacitance of the dummy devices.

15. The method of claim 14, wherein the dummy devices are added based on the criteria of static circuit or dynamic circuit.

16. The method of claim 14, wherein the signals of circuits are categorized into static signals and dynamic signals, further comprising adding dummy devices on the static signals and only selected dynamic signals.

17. The method of claim 1, comprising fabricating the IC.

18. A system to design an integrated circuit (IC), comprising:

a processor to receive an IC design with one or more circuits thereon;

code for adding anti-reverse engineering for the IC by expanding a complexity of one or more circuits or disguising a selected circuit;

code for checking if a functional block is an open-loop static circuitry and adding dummy devices on signal nets for open loop static circuits and otherwise separating static signals from dynamic signals and adding dummy devices on static signals; and code for rendering a layout of the IC with the anti-reverse engineering design.

19. An integrated circuit, comprising:

a plurality of functioning circuits on a substrate;

a disguised circuit on the substrate or one or more complexity adding circuits on the substrate to foil piracy by checking if a functional block is an open-loop static circuitry and adding dummy devices on signal nets for open loop static circuits and otherwise separating static signals from dynamic signals and adding dummy devices on static signals; and, wherein the disguised circuit or the complexity adding circuit meets a predetermined performance with added devices and associated extra capacitance of the dummy devices.

20. The IC of claim 19, wherein the signals of circuitry are categorized into static signals and dynamic signals, further comprising adding dummy devices on the static signals and only selected dynamic signals.

* * * * *